United States Patent [19]

Stone et al.

[11] 3,770,350
[45] Nov. 6, 1973

[54] METHOD UTILIZING AN OPTICAL FIBER RAMAN CELL

[75] Inventors: Julian Stone, Rumson; George Edouard Walrafen, Basking Ridge, both of N.J.

[73] Assignee: Bell Telephone Laboratories, Incorporated, Murray Hill, N.J.

[22] Filed: July 24, 1972

[21] Appl. No.: 274,597

[52] U.S. Cl................. 356/75, 250/218, 350/96 R, 356/244, 356/246
[51] Int. Cl............................................... G01j 3/44
[58] Field of Search................ 350/96 R; 356/75, 356/244, 246; 250/218

[56] References Cited
UNITED STATES PATENTS
3,556,659  1/1971  Hawes.................................. 356/75

OTHER PUBLICATIONS

Bailey et al., "A New Raman Microsampling Technique," Analytical Chemistry Vol. 39, No. 8, July 1967, pages 1040–1044.

*Primary Examiner*—David Schonberg
*Assistant Examiner*—F. L. Evans
*Attorney*—W. L. Keefauver

[57] ABSTRACT

A long length of liquid-core optical fiber is employed as a Raman cell, wherein the fiber core contains the material whose Raman spectrum is to be analyzed. Spectral intensifications of from $10^2$ to $10^3$ times greater than that obtained by conventional means are realized, using very small sample volumes. Optimum fiber lengths are disclosed.

5 Claims, 3 Drawing Figures

PATENTED NOV 6 1973 3,770,350
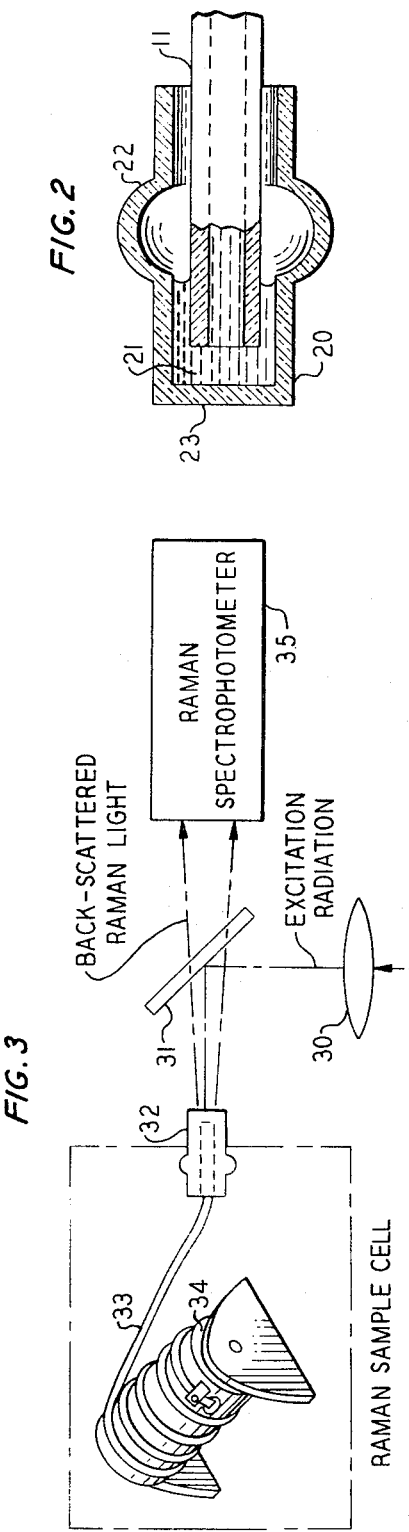
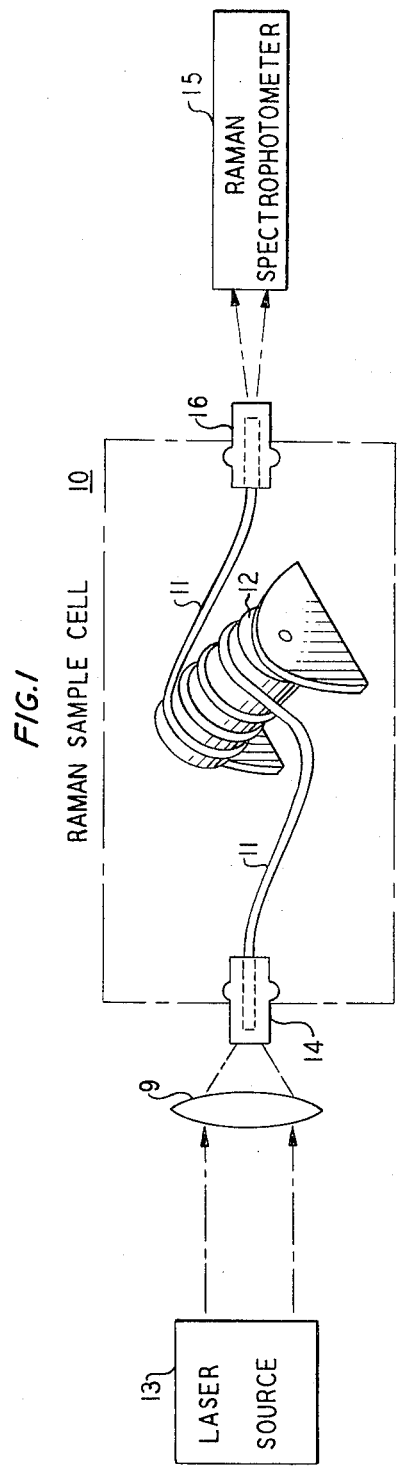

3,770,350

METHOD UTILIZING AN OPTICAL FIBER RAMAN CELL

This invention relates to Raman spectroscopy and, in particular, to improved Raman sample cells.

BACKGROUND OF THE INVENTION

The so-called "Raman effect" is a form of light scattering wherein photons of exciting radiation interact with molecules of a substance in such a way that a quantized exchange of energy takes place. The resulting radiation can then be analyzed and, in conjunction with other studies, provides information about the molecular structure. Unfortunately, the Raman effect process is extremely inefficient so that measurements are relatively difficult to make. As a result, good commercial apparatus, capable of separating Raman radiation from other effects tend to be relatively expensive.

It is, therefore, the broad object of the present invention, to improve the efficiency of Raman sample cells.

SUMMARY OF THE INVENTION

A Raman sample cell, in accordance with the present invention, comprises a long length of liquid-core optical fiber wherein the core material includes, in solution, the material whose Raman spectrum is to be analyzed. As is known, when the refractive index of the core of an optical fiber is greater than that of the surrounding cladding, radiation within the core can be guided along the fiber. Using any high intensity signal source as the excitation radiation, the Raman emission produced thereby in the sample material, and trapped within the core of the fiber, propagates along the fiber. This process continues along the length of the fiber such that the intensity of the spontaneous Raman emission first increases to a maximum with fiber length and then decreases as the fiber attenuation becomes dominant. An optimum cell length is given.

It is an advantage of the present invention that spectral intensifications of from two to three orders of magnitude have been obtained as compared to that obtainable using prior art cells.

It is a further advantage of the invention that very small sample volumes are required.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWING

FIG. 1 shows a first embodiment of an optical fiber Raman cell wherein the excitation radiation is applied at one end of the cell, and the Raman radiation extracted at the other end of the cell;

FIG. 2 shows a cross-sectional view of the input and output couplers used to couple to and from the length of optical fiber; and FIG. 3 shows a second embodiment of the invention using the backward-scattered Raman emission.

DETAILED DESCRIPTION

Referring to the drawings, FIG. 1 shows a Raman sample cell 10, in accordance with the present invention, comprising a length of liquid-core optical fiber 11, wherein the core fluid is a solution of the Raman sample material. For convenience, the fiber is shown wound on a drum 12. The excitation radiation, preferably derived from a laser source 13, is coupled into one end of fiber 11 by means of lens 9 and an input coupler 14. The Raman radiation is coupled out of the other end of fiber 11 and into a Raman spectrophotometer 15 by means of an output coupler 16.

FIG. 2 shows a cross-sectional view of the input and output couplers, each of which comprises a capillary tube 20, partially filled with a fluid 21 comprising either core material which, in this case, is a solution of the sample material, or any other suitable material of like refractive index. The fiber 11 extends into the sample material through an open end of the coupler. Surface tension prevents the fluid from flowing past a slight bulge 22 in tube 20 and out of the coupler. The input excitation, is coupled into the fiber end through a flat window 23. In the case of an output coupler, the radiation emanating from fiber 11 is coupled out through window 23.

As is known, an optical fiber guides electromagnetic radiation by reflection at the core-cladding interface. The maximum angle $\theta_c$ a ray can make with the interface and still be reflected is, from Snell's law, given by $$\theta \approx \sqrt{2\Delta/n_l} \text{ radians} \quad (1)$$

where
$n_l$ is the refractive index of the core material;
$\Delta = n_l - n_c$
$n_c$ is the refractive index of the cladding;
and
$\Delta/n_l << 1$.

In the instant case, the core material is the sample solution, and the cladding is the hollow tube containing the sample solution.

In operation, the excitation radiation incident at one end of fiber 11 propagates along the fiber, interacting with the sample material. A portion of the induced Raman radiation is trapped within the core and propagates to the output end of the fiber from which it is coupled into spectrophotometer 15.

Assuming that the attenuation coefficient, $\alpha$, for the excitation radiation, and the attenuation coefficient for the Raman radiation are the same, the intensity $I_R$ of the Raman radiation at the output end of the fiber is given by $$I_R = g\pi\theta_c^2 \, I \, xe^{-\alpha x} \quad (2)$$

where
$g$ is the Raman scattering cross section;
$\pi\theta_c^2$ is the solid angle of radiation guided in the forward direction within the fiber core;
$I$ is the intensity of the incident excitation radiation; and
$x$ is the fiber length.

As is evident from equation (2), the Raman radiation increases as a function of fiber length, reaching a maximum, and then decreases as the fiber attenuation becomes dominant. The optimum fiber length, $L$, for maximum Raman radiation for the stated condition is given by $$L = 1/\alpha \quad (3)$$

EXPERIMENTAL PROCEDURE

A number of experiments were run using hollow, fused quartz tubing filled in turn, with the various liquids to be studied serving as the core material of the optical fiber sample cell. The inside diameter of the tubing was approximately 75 $\mu$m and the outside diameter about 100 $\mu$m. It should be noted that the exact cross section of the fiber cell is not at all critical. The refractive index of the quartz is about 1.463 over the wavelength range of interest. Accordingly, only liquids having indices above 1.463 could be examined with this tubing. Fiber lengths between 20 to 30 meters were used. The 4,880 angstrom excitation radiation used was derived from an argon-ion laser operating at power levels of up to 250 mw. The radiation was focused onto the input end of the fiber by means of a 5X microscope objective. The Raman emission was analyzed by a Cary Model 81 Spectrophotometer.

Some of the liquids examined included benzene and tetrachoroethylene.

As indicated hereinabove, one of the advantages of a fiber sample cell is the high intensity Raman emission that is obtained using extremely small sample volumes. Specifically, emission intensities of the order of $10^2$ to $10^3$ times greater than that available using prior art Raman cells are readily realizable using sample volumes of about 0.1 cm$^3$.

To remove energy trapped in the quartz tubing, the output end of the latter can be immersed in a higher refractive index fluid, forming a mode stripper.

It is a further advantage of the invention that the Raman radiation is emitted from a fiber end which is very small. Thus, the Raman source approaches a point source which can be conveniently placed at the focal point of the "image-slicer" in the spectrophotometer, resulting in optimum resolution of the Raman spectrum. In addition, the enhancement of Raman intensities that result from the above-described fiber technique can partially obviate or supplement the use of sophisticated electronic systems now required to detect the very low intensity Raman emission produced by currently available sample cells.

As indicated above, the refractive index of the sample material at the Raman wavelength must be greater than that of the fiber tubing at the same wavelength. Thus, to extend the range of materials that can be measured by this technique, tubing made of other materials, such as Teflon ($n = 1.35$), can be used, In the embodiment of FIG. 1, the excitation radiation is coupled into one end of the sample cell and the Raman radiation extracted from the other end of the cell. It should be noted, however, that in addition to the Raman radiation, a much higher level of the excitation radiation will also be present at the output end of the cell. This would make it extremely difficult to study Raman lines that are close to the wavelength of the excitation radiation. Also, from equation (3), it will be noted that the optimum fiber length is a function of the attenuation coefficient of the sample material. This means that to obtain maximum Raman emission, a different length cell would be required for materials having different coefficients. Both of these limitations are obviated in a second embodiment of the invention now to be described in connection with FIG. 3.

In the alternate embodiment of a Raman cell shown in FIG. 3, the excitation radiation, derived from a source (not shown) is coupled into an end of an optical fiber 33 by means of a lens 30, beam splitter 31, and coupler 32. The fiber 33, whose length is larger than the optimum length given hereinbelow by equation (5), is conveniently wound on a drum 34.

In the embodiment of FIG. 1, the forward-scattered Raman emission was used. However, an equal amount of Raman radiation is propagated in the backward direction in the fiber. The intensity $I_R'$ of the backward scattered Raman radiation emitted at the fiber end is $$I_R' = g\pi\theta_c^2 I/2\alpha \ (1 - e^{-2\alpha x})$$

(4)

While this function increases continuously with $x$, it reaches a practical optimum length $L'$ given by $$L' = 1/2\alpha$$

(5)

The arrangement illustrated in FIG. 3 has two advantages. First, while the Raman emission coupled to the spectrophotometer 35 may be reduced by a factor of one-half by the beam splitter, essentially none of the excitation radiation which propagates away from the input end of the fiber appears at the input of the spectrophotometer. Thus, the resulting increase in the signal-to-noise ratio permits examination of the Raman spectrum near and at the wavelength of the excitation radiation. Secondly, by using the backward-scattered radiation and making the fiber length greater than $1/2\alpha$ for all anticipated sample materials, the optimum fiber length is automatically realized for all sample materials. Thus, optimum emission can be obtained using the same fiber regardless of the long coefficient of the sample material.

In the above-discussion, it was noted that maximum Raman emission can be realized when the fiber length is approximately equal to the reciprocal of the attenuation coefficient. Specifically, spectral intensifications of about $10^3$ can be obtained in the optimum case and, clearly, this is highly desirable. However, shorter lengths can also be used and still obtain significant improvements. For example, results comparable to anything obtained previously can be realized using a fiber length of about 10–20 cm. A 10-fold improvement can be realized using a fiber length of about 1 meter.

Thus, in all cases it is understood that the above-described arrangement is illustrative of but a few of the many possible specific embodiments which can represent applications of the principles of the invention. Numerous and varied other arrangements can readily be devised in accordance with these principles by those skilled in the art without departing from the spirit and scope of the invention.

What is claimed is:

1. A method of inducing and collecting Raman radiation comprising the steps of:

directing a beam of excitation radiation onto an end of a liquid core optical fiber and guiding said beam therealong, where the fiber core comprises a solution of the Raman sample material, and the fiber cladding is a low-loss material having a lower refractive index than said sample material at both the wavelength of the excitation radiation, and the wavelength of the induced Raman radiation;

and extracting the induced Raman radiation from an end of said fiber.

2. The method according to claim 1 wherein said excitation radiation is directed onto one end of said fiber; and wherein said Raman radiation is extracted from the other end of said fiber.

3. The method according to claim 1 wherein said excitation radiation is directed onto one end of said fiber; said Raman radiation is extracted from said same one end; and wherein the length of said fiber is greater than $1/2\alpha$ where $\alpha$ is the attenuation coefficient of said fiber.

4. The method according to claim 1 wherein said fiber is at least 20 centimeters long.

5. The method according to claim 1 where the length of said fiber $L$, is given by $$L = 1/\alpha$$

where $\alpha$ is the average attenuation coefficient over the frequency band of interest.

* * * * *